Aug. 15, 1944.
D. SELL
2,355,754
LAWN MOWER SHARPENER
Filed Aug. 11, 1943
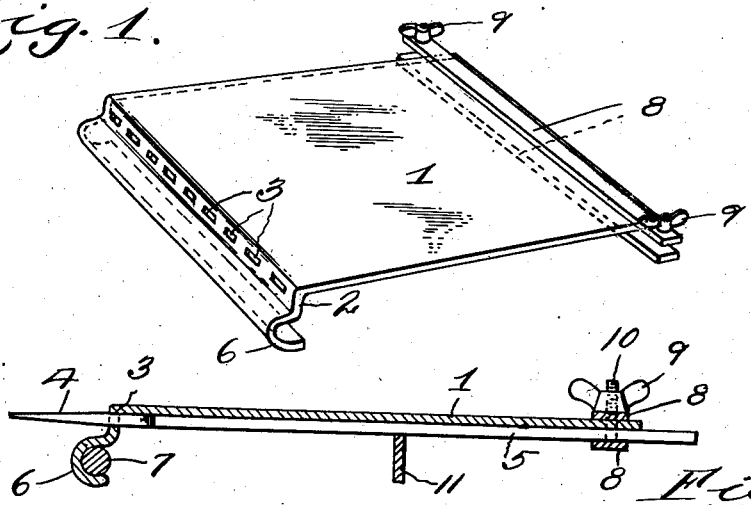
Fig. 1.
Fig. 2.
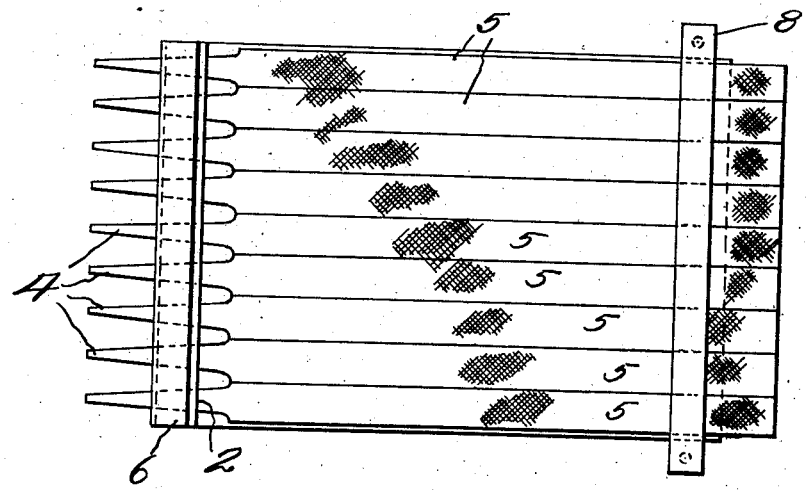
Fig. 3.
Inventor
Daniel Sell
By Philip A. H. Ferrell
Attorney Patented Aug. 15, 1944

2,355,754

UNITED STATES PATENT OFFICE 2,355,754

LAWN MOWER SHARPENER

Daniel Sell, Kansas City, Mo.

Application August 11, 1943, Serial No. 498,234

2 Claims. (Cl. 76—82.1)

The invention relates to lawn mower sharpeners and has for its object to provide a device of this character comprising a body member having a hooked flange at one end adapted to hook over the stationary cross rod on the under side of the lawn mower, and extend over the cutter blade reel, and having means whereby a plurality of abrading elements, preferably files, in side to side relation, are held so that when the reel is rotated the spirally arranged blades will be uniformly sharpened throughout their length.

A further object is to provide the body member with a downwardly extending apertured flange merging into the rod receiving flange for the reception of the handle end of the file elements, and clamping members at the outer end of the body member for securely clamping the abrading elements to the underside of the body member and maintaining said abrading elements in the same plane so there will be a uniform sharpening of the reel blades as the reel is rotated.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the sharpening device.

Figure 2 is a vertical longitudinal sectional view through the sharpening device.

Figure 3 is a bottom plan view of the sharpening device.

Referring to the drawing, the numeral I designates the brading element holder, which holder is flat, and 2 a downwardly extending flange at the rear end thereof. The flange 2 is provided with a plurality of apertures 3, which receive the tapered handle ends 4 of the abrading elements 5. The abrading elements 5 are shown as files, for purposes of illustration, other types of abrading elements however may be used, for instance stone. The flange 2 terminates in a rod receiving flange 6, which is U-shaped in vertical transverse cross section and adapted to be hooked over the lawn mower rod 7 on the under side of the lawn mower when inverted. Rod 7 is a stationary element. The files 5 closely engage the under side of the holder member I and extend forwardly, and are clamped rigidly to the holder by means of clamping bars 8 engaging the upper side of the holder I and the under sides of the files 5. It will be seen that when the butterfly nuts 9 are tightened on their bolts 10 that the files 5 will be rigidly held in position and that all of said files will be held in the same plane. When the device is in use as shown in Figure 2, the files 5 overlie the cutter blades 11 of the reel, and as the reel is rotated the blades 11 will be uniformly ground throughout their length, therefore there will not be high and low spots in the cutting edge of each blade, which is the common difficulty experienced with reciprocating types of lawn mower sharpeners, or where simply a file is used.

Additional pressure may be manually applied to the outer end of the holder during the sharpening operation. It is understood the reel may be rotated in any suitable manner, for instance by rotating one of the lawn mower wheels, or applying a handle to one of the wheels. Applicant does not limit himself in this particular.

From the above it will be seen that a lawn mower reel sharpener is provided which is simple in construction the parts reduced to a minimum, and one wherein the objectionable features of the reciprocating type are eliminated.

The invention having been set forth what is claimed as new and useful is:

1. The combination with a stationary lawn mower rod, a lawn mower cutter reel, of an abrading element holding device, said device comprising a flat body member, one end of said body member terminating in a downwardly extending apertured flange, a hooked flange carried by said apertured flange and adapted to hook over the stationary rod and the body member overlying the reel, a plurality of abrading elements in side engagement carried by the under side of the body member, said abrading elements having reduced ends extending through the apertures of the apertured flange and means for clamping the outer ends of the abrading elements to the under side of the body member and maintaining the abrading elements in the same plane.

2. A device as set forth in claim 1 wherein the clamping means comprises spaced bars above and below the free end of the body member and extending beyond opposite sides of the body member and securing bolts connecting the outer ends of the bars together.

DANIEL SELL.